(12) United States Patent
Curtis et al.

(10) Patent No.: US 8,179,579 B2
(45) Date of Patent: May 15, 2012

(54) HROM REPLICATION METHODS, DEVICES OR SYSTEMS, ARTICLES USED IN SAME AND ARTICLES GENERATED BY SAME

(75) Inventors: Kevin R. Curtis, Longmont, CO (US); Ernest Chuang, Louisville, CO (US); Alan Hoskins, Golden, CO (US)

(73) Assignees: InPhase Technologies, Inc., Longmont, CO (US); Hitachi, Ltd., Tokyo (JP)

( * ) Notice: Subject to any disclaimer, the term of this patent is extended or adjusted under 35 U.S.C. 154(b) by 696 days.

(21) Appl. No.: 12/124,209

(22) Filed: May 21, 2008

(65) Prior Publication Data
US 2009/0046334 A1 Feb. 19, 2009

Related U.S. Application Data

(60) Provisional application No. 60/956,463, filed on Aug. 17, 2007.

(51) Int. Cl.
*G03H 1/20* (2006.01)
*G03H 1/28* (2006.01)
*G11B 7/00* (2006.01)

(52) U.S. Cl. ............................ 359/12; 359/24; 369/103
(58) Field of Classification Search .................... 359/12, 359/22, 24, 32; 369/103
See application file for complete search history.

(56) References Cited

U.S. PATENT DOCUMENTS

| | | | |
|---|---|---|---|
| 6,103,454 A | 8/2000 | Dhar et al. | |
| 6,156,425 A | 12/2000 | Bouquerel et al. | |
| 6,272,095 B1 | 8/2001 | Liu et al. | |
| 6,322,933 B1 | 11/2001 | Daiber et al. | |
| 6,418,106 B1 | 7/2002 | Stoll | |
| 6,482,551 B1 | 11/2002 | Dhar et al. | |
| 6,650,447 B2 | 11/2003 | Curtis et al. | |
| 6,743,552 B2 | 6/2004 | Setthachayanon et al. | |
| 6,765,061 B2 | 7/2004 | Dhar et al. | |
| 6,780,546 B2 | 8/2004 | Trentler et al. | |
| 7,092,133 B2 | 8/2006 | Anderson et al. | |
| 7,161,723 B1 | 1/2007 | Silveira | |
| 2003/0039001 A1 | 2/2003 | King et al. | |
| 2003/0206320 A1 | 11/2003 | Cole et al. | |
| 2004/0027625 A1 | 2/2004 | Trentler et al. | |
| 2005/0036182 A1 | 2/2005 | Curtis | |
| 2005/0254108 A1 | 11/2005 | Chuang et al. | |
| 2006/0002274 A1* | 1/2006 | Kihara et al. | 369/103 |
| 2006/0203328 A1 | 9/2006 | Lazarev et al. | |
| 2006/0203689 A1 | 9/2006 | Kanaoka et al. | |
| 2007/0013985 A1 | 1/2007 | Chuang et al. | |
| 2007/0030787 A1 | 2/2007 | Kim | |
| 2007/0053029 A1* | 3/2007 | Raguin et al. | 359/12 |

OTHER PUBLICATIONS

U.S. Appl. No. 11/840,410, filed Aug. 17, 2007, Curtis et al.
McLeod, R., et al, "Micro-Holographic Multi-Layer Optical Disk Data Storage," International Symposium on Optical Memory and Optical Data Storage, Jul. 2005.

(Continued)

*Primary Examiner* — Alessandro Amari
(74) *Attorney, Agent, or Firm* — Vedder Price P.C.; Ajay A. Jagtiani

(57) ABSTRACT

HROM replication methods, devices or systems are disclosed herein. Also disclosed herein are articles comprising conical reference (reconstruction) beam hologram elements to generate conical or conical like reference (reconstruction) beams which may be used in such HROM replication methods, devices or systems. Further disclosed herein are articles comprising a target medium which may be used in such HROM replication methods, devices or systems.

14 Claims, 3 Drawing Sheets

OTHER PUBLICATIONS

Psaltis, D., et al, "Holographic Memories," Scientific American, Nov. 1995, pp. 1-11.

Horimai, et al, "Duplication Technology for Secured Read-Only Holographic Versatile Disc," Optware Corporation, Optical Data Storage Conference, Jul. 11, 2005.

Chuang, E., et al, "Holographic Read-Only-Memory System for High-Speed Replication," Japan J. Appl. Phys., 42 (2003), pp. 976-980.

PCT/US2008/64330 International Search Report and the Written Opinion of the International Searching Authority, or the Declaration mailed Aug. 15, 2008.

PCT/US2007/76188 International Search Report and the Written Opinion of the International Searching Authority, or the Declaration mailed Aug. 22, 2008.

* cited by examiner

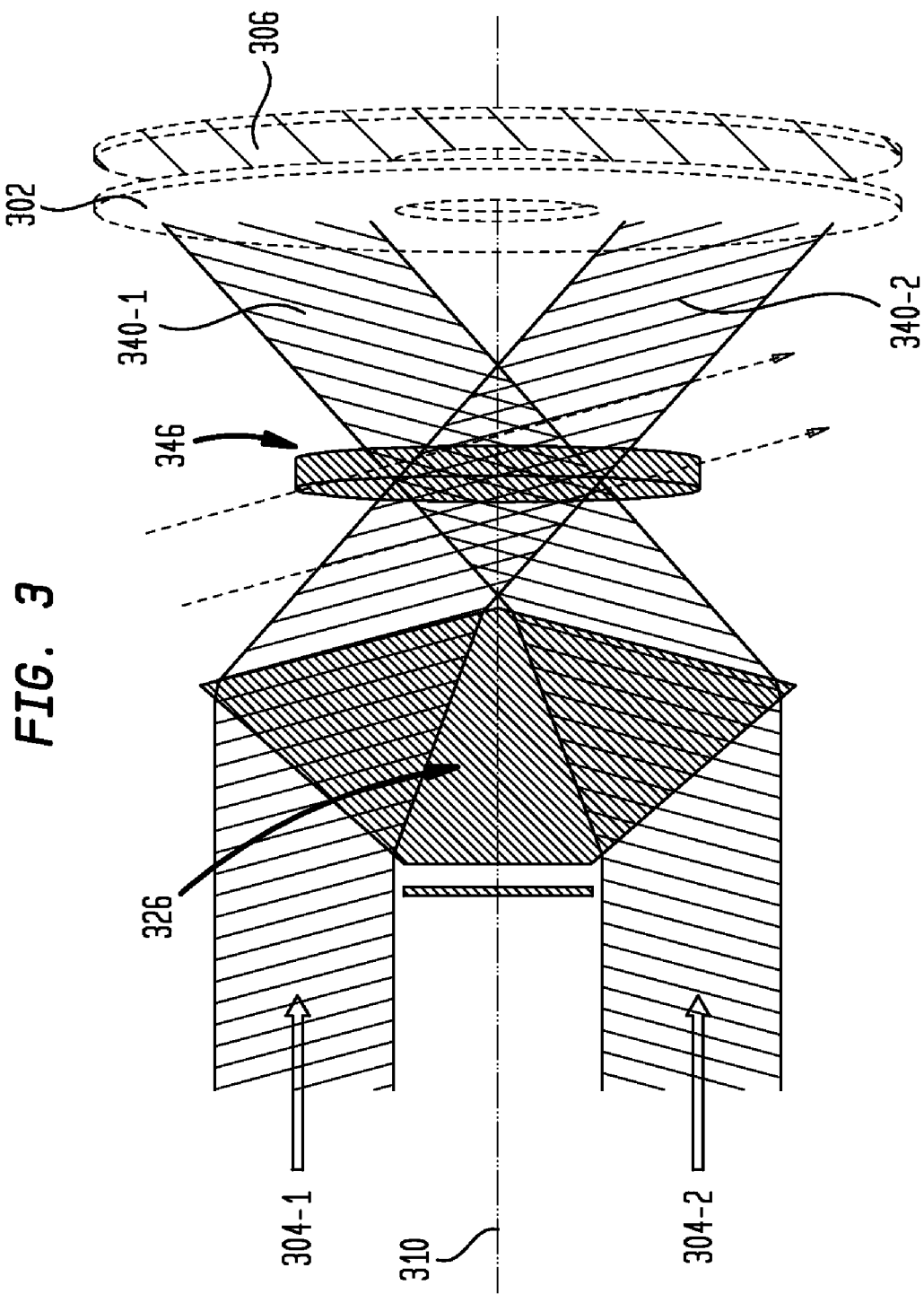

HROM REPLICATION METHODS, DEVICES OR SYSTEMS, ARTICLES USED IN SAME AND ARTICLES GENERATED BY SAME

CROSS-REFERENCE TO RELATED APPLICATIONS

This application makes reference to the following U.S. patent applications. The first application is U.S. Prov. Application No. 60/855,754, entitled "MONOCULAR HOLOGRAPHIC DATA STORAGE SYSTEM ARCHITECTURE," filed Nov. 1, 2006. The second application is U.S. Prov. App. No. 60/872,472, entitled "PHASE CONJUGATE READOUT GEOMETRIES FOR HOLOGRAPHIC DATA STORAGE," filed Dec. 4, 2006. The third application is U.S. application Ser. No. 11/840,410, entitled "MONOCULAR HOLOGRAPHIC DATA STORAGE SYSTEM ARCHITECTURE," to Curtis et al., filed Aug. 17, 2007. The fourth application is U.S. App. No. 60/956,463, entitled "HROM REPLICATION METHODS," to Curtis et al., filed Aug. 17, 2007. The entire disclosure and contents of the above applications are hereby incorporated by reference.

STATEMENT OF JOINT RESEARCH AGREEMENT

In compliance with 37 C.F.R. §1.71(g) (1), disclosure is herein made that the inventions described and claimed herein were made pursuant to a Joint Research Agreement as defined in 35 U.S.C. 103 (c) (3), that was in effect on or before the date the inventions were made, and as a result of activities undertaken within the scope of the Joint Research Agreement, by or on the behalf of Hitachi Co., Ltd. and InPhase Technologies, Inc.

BACKGROUND

1. Field of the Invention

The present invention relates generally to HROM replication methods, devices or systems. The present invention also relates to articles comprising a conical reference (reconstruction) beam hologram element to generate conical or conical like reference (reconstruction) beams which may be used in such HROM replication methods, systems or devices. The present invention further relates to an article comprising a target holographic storage medium which may be used in such HROM replication methods, devices or systems.

2. Related Art

Developers of information storage devices and methods continue to seek increased storage capacity. As part of this development, holographic memory systems have been suggested as alternatives to conventional memory devices. Holographic memory systems may be designed to record data as one bit of information (i.e., bit-wise data storage). See McLeod et al. "Micro-Holographic Multi-Layer Optical Disk Data Storage," *International Symposium on Optical Memory and Optical Data Storage* (July 2005). Holographic memory systems may also be designed to record an array of data that may be a 1-dimensional linear array (i.e., a 1×N array, where N is the number linear data bits), or a 2-dimensional array commonly referred to as a "page-wise" memory system. Page-wise memory systems may involve the storage and readout of an entire two-dimensional representation, e.g., a page of data. Typically, recording light passes through a two-dimensional array of low and high transparency areas representing data, and the system stores, in three dimensions, the pages of data holographically as patterns of varying refractive index imprinted into a storage medium. See Psaltis et al., "Holographic Memories," *Scientific American*, November 1995, where holographic systems are discussed generally, including page-wise memory systems.

Holographic data storage systems may perform a data write (also referred to as a data record or data store operation, simply "write" operation herein) by combining two coherent light beams, such as laser beams, at a particular point within the storage medium. Specifically, a data-encoded light beam may be combined with a reference light beam to create an interference pattern in the holographic storage medium. The pattern created by the interference of the data beam and the reference beam forms a hologram which may then be recorded in the holographic medium. If the data-bearing beam is encoded by passing the data beam through, for example, a spatial light modulator (SLM), the hologram(s) may be recorded in the holographic medium.

Holographically-stored data may then be retrieved from the holographic data storage system by performing a read (or reconstruction) of the stored data. The read operation may be performed by projecting a reconstruction or probe beam into the storage medium at the same angle, wavelength, phase, position, etc., as the reference beam used to record the data, or compensated equivalents thereof. The hologram and the reference beam interact to reconstruct the data beam.

Holographic Read Only Memory (Holographic ROM or HROM) storage media are known. In the past, holographic data has been recorded in disc format HROM in an incremental manner by successively aligning different locations on the HROM with the data beam and the reference beam to record successive data bits. Different data may be recorded at each successive location by changing the information imparted through a spatial light modulator (SLM) or successive data masks. See, for example, U.S. Pat. No. 6,272,095, (Liu, et al.), issued Aug. 7, 2001, which describes several examples of illustrative prior recording techniques, and is incorporated herein by reference in its entirety. Multiple holograms may also be stacked in virtual image layers through wavelength multiplexing, angle multiplexing, shift multiplexing, confocal multiplexing, or other multiplexing techniques. Each hologram in a stack may comprise a page of information, where a "page" is a collection of bits or of pixel data stored together, e.g., as a 2048×2048 array or a 10×10 array. See U.S. Pat. No. 6,322,933, (Daiber et al.), issued Nov. 27, 2001, which describes several examples of illustrative prior volume recording techniques. See also Ernest Chuang, et al. "Holographic ROM System for High Speed Replication," presented at the Optical Data Storage Conference, Jul. 8, 2002, in Hawaii, USA., and Ernest Chuang, et al. "Holographic Read-Only-Memory System for High-Speed Replication," *Jpn. J. Appl. Phys.*, 42 (2003), pp. 976-80, which also describe recording techniques and the bitwise retrieval of an HROM.

SUMMARY

According to a first broad aspect of the present invention, there is provided a device or system comprising:
  a reference beam source which generates a reference beam; and
  a conical prism through which the reference beam passes and which generates a conical or conical-like reference beam for illuminating a master data holographic storage medium having one or more recorded holograms, to thereby replicate the one or more recorded holograms in a target holographic storage medium.

According to a second broad aspect of the present invention, there is provided a device or system comprising:

a reference beam source which generates a reference beam; and a conical reference beam holograph element which, when illuminated with the reference beam, generates a conical or conical-like reference beam for illuminating a master data holographic storage medium having one or more recorded holograms, to thereby replicate the one or more recorded holograms in a target holographic storage medium.

According to a third broad aspect of the present invention, there is provided an article comprising a conical reference beam hologram element having stored therein by angle multiplexing different conical or conical-like waves, to thereby generate different conical or conical-like reference beams when the conical reference beam hologram element is illuminated with a reference beam at different incident angles.

According to a fourth broad aspect of the present invention, there is provided a method comprising the following steps:

(a) providing a conical or conical-like reference beam; and
(b) illuminating a master data holographic storage medium having one or more recorded holograms, to thereby replicate the one or more recorded holograms in a target holographic storage medium.

BRIEF DESCRIPTION OF THE DRAWINGS

The invention will be described in conjunction with the accompanying drawings, in which:

FIG. 3 is a schematic illustration of an embodiment of the present invention for the generation of conical reference (reconstruction) beams, as well as the creation of a conical reference (reconstruction) beam hologram element.

DETAILED DESCRIPTION

Figure 2:
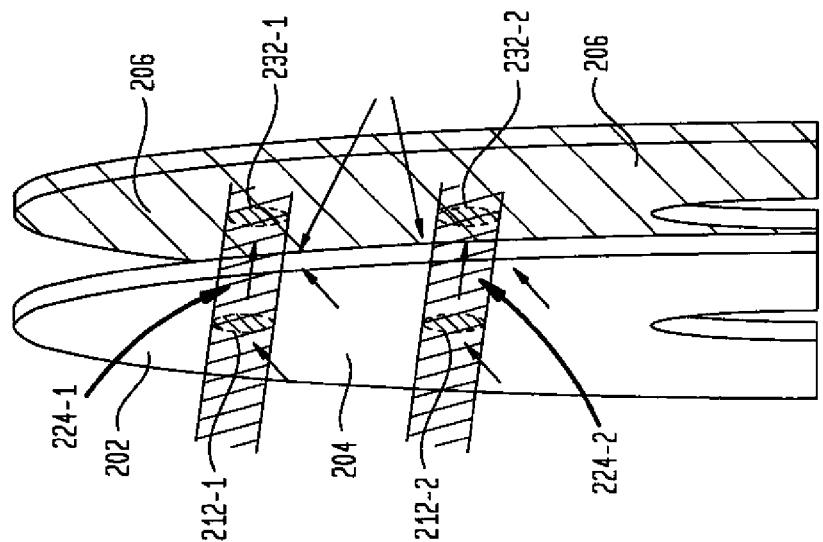
FIG. 2 is schematic illustration of the replication of holograms in parallel from a master data disk to a target disk.

It is advantageous to define several terms before describing the invention. It should be appreciated that the following definitions are used throughout this application.

DEFINITIONS

Where the definition of terms departs from the commonly used meaning of the term, applicant intends to utilize the definitions provided below, unless specifically indicated.

For the purposes of the present invention, directional terms such as "top", "bottom", "above", "below", "left", "right", "horizontal", "vertical", "upward", "downward", etc. are merely used for convenience in describing the various embodiments of the present invention. The embodiments of the present invention may be oriented in various ways. For example, the embodiments shown in FIGS. 1 through 4 may be flipped over, rotated by 90° in any direction, etc.

For the purposes of the present invention, the term "coherent light beam" refers to a beam of light including waves with a particular (e.g., constant) phase relationship, such as, for example, a laser beam. A coherent light beam may also be referred to as light in which the phases of all electromagnetic waves at each point on a line normal to the direction of the light beam are identical, and may also include partially coherent light and light with finite or limited coherence length that many light sources have or provide.

For the purposes of the present invention, the term "data beam" refers to a beam containing a data signal. For example, a data beam may include beams that have been modulated by a modulator such as a spatial light modulator (SLM), along with a beam generated in response to a reference beam impingent on a holographic storage medium, where the generated beam includes data. The modulation of the data beam may be an amplitude, a phase or some combination of the amplitude and phase. The SLM may be reflective or transmissive. The data beam may be modulated into a binary state or into a plurality of states. The data beam may include data as well as headers that contain information about the data to be stored or where the data is stored. The data beam may also include known bits for a servo or to detect the location of the data once it is detected by or on a detector such as, for example, a CMOS sensor array.

For the purposes of the present invention, the term "data modulated beam" refers to a data beam that has been modulated by a modulator such as a spatial light modulator (SLM). The modulation of the data beam may be an amplitude, a phase or some combination of the amplitude and phase. The SLM may be reflective or transmissive. The data beam may be modulated into a binary state or into a plurality of states.

For the purposes of the present invention, the term "data modulator" refers to any device that is capable of optically representing data in a single bit or in one or two-dimensions from a signal beam.

For the purposes of the present invention, the term "data page" or "page" refers to the conventional meaning of data page as used with respect to holography. For example, a data page may be a page of data (i.e., a two-dimensional assembly of data), one or more pictures, etc., to be recorded or recorded in a holographic storage medium. The data page may include header information and known bits for servo and channel usage, as well as bits that represent the data to be stored or processed.

For the purposes of the present invention, the term "detector" refers to any type of device capable of detecting something. For example, exemplary detectors may include devices capable of detecting the presence or intensity of light, such as for example, a camera or quad cell, complementary metal-oxide-semiconductor (CMOS) imaging sensors or arrays, charge-coupled device (CCD) arrays, etc.

For the purposes of the present invention, the term "disk" refers to a disk-shaped holographic storage medium.

For the purposes of the present invention, the terms "holographic grating," "holograph" or "hologram" (collectively and interchangeably referred to hereafter as "hologram") are used in the conventional sense of referring to an interference pattern formed when a signal beam and a reference beam interfere with each other. In cases wherein digital data is recorded page-wise, the signal beam may be encoded with a data modulator, e.g., a spatial light modulator, etc.

For the purposes of the present invention, the term "storage medium" refers to any component, material, etc., capable of storing information, such as, for example, a holographic storage medium.

For the purposes of the present invention, the term "holographic storage medium" refers to medium that has a least one component, material, layer, etc., that is capable of recording and storing one or more holograms (e.g., bit-wise, linear array-wise or page-wise) as one or more patterns of varying refractive index imprinted into the medium. Examples of a holographic medium useful herein include, but are not limited to, those described in: U.S. Pat. No. 6,103,454 (Dhar et al.), issued Aug. 15, 2000; U.S. Pat. No. 6,482,551 (Dhar et al.), issued Nov. 19, 2002; U.S. Pat. No. 6,650,447 (Curtis et al.), issued Nov. 18, 2003, U.S. Pat. No. 6,743,552 (Setthachayanon et al.), issued Jun. 1, 2004; U.S. Pat. No. 6,765,061 (Dhar et al.), Jul. 20, 2004; U.S. Pat. No. 6,780,546 (Trentler et al.), issued Aug. 24, 2004; U.S. Patent Application No. 2003/0206320 (Cole et al.) published Nov. 6, 2003; and U.S. Patent Application No. 2004/0027625 (Trentler et al.), published Feb. 12, 2004, the entire disclosure and contents of which are herein incorporated by reference. The holographic medium may comprise photopolymers, photo-chromatic, materials, photo-refractive materials, etc. The holographic storage medium may be any type, including: a transparent holographic storage medium, a holographic storage medium including a plurality of components or layers such as a reflective layer, a holographic storage medium including a reflective layer and a polarizing layer so reflection may be controlled with polarization, a holographic storage medium including variable beam transmission layer that may be pass, absorb, reflect, be transparent to, etc., light beams, grating layers for reflecting light beams, substrates, substrates with servo markings, etc. The storage medium may be highly transmissively flat (thus making multiplexing easier and better) or not flat. An example of an inexpensive flat storage medium (e.g., to better than a couple wavelengths within the area where data may stored may use what is referred to herein as the Zerowave™ process, which is described in U.S. Pat. No. 6,156,425 (Bouquerel et al.), issued Dec. 5, 2000, the entire disclosure and contents of which is hereby incorporated by reference. All holographic storage medium described herein may be, for example, in the shape, form, etc., of a disk, card, flexible tape media, etc.

For the purposes of the present invention, the term "upper surface" refers to the surface of the holographic storage medium that acts as an interface between the air and the holographic storage medium. The upper surface (which may also be referred to as an "outer surface") may, or may not, be or have an anti-reflective coating.

For the purposes of the present invention, the term "holographic recording" refers to the act of recording a hologram in a holographic storage medium. The holographic recording may provide bit-wise storage (i.e., recording of one bit of data), may provide storage of a 1-dimensional linear array of data (i.e., a 1×N array, where N is the number linear data bits), or may provide 2-dimensional storage of a page of data.

For the purposes of the present invention, the term "light source" refers to a source of electromagnetic radiation having a single wavelength or multiple wavelengths. The light source may be from a laser, one or more light emitting diodes (LEDs), etc.

For the purposes of the present invention, the term "multiplexing" refers to recording, storing, etc., a plurality of holograms in the same volume or nearly the same volume of the holographic storage medium by varying a recording parameter(s) including, but not limited to, angle, wavelength, phase code, polytopic, shift, correlation, peristrophic, fractal, etc., including combinations of parameters, e.g. angle-polytopic multiplexing. For example, angle multiplexing involves varying the angle of the plane wave or nearly plane wave of the reference beam during recording to store a plurality of holograms in the same volume. The multiplexed holograms that are recorded, stored, etc., may be read, retrieved, reconstructed, recovered, etc., by using/changing the same recording parameter(s) used to record, store, etc., the respective holograms.

For the purposes of the present invention, the term "polytopic multiplexing" refers to a multiplexing recording method or technique where the recording books of holograms is spatially overlapped. The spacing between books may be at least the beam waist, which is the narrowest part of the signal beam. An aperture may be placed in the system at the beam waist. During readout, all of the overlapped holograms at a given multiplexing angle may be read out, but only the hologram that is centered in the aperture is passed through to the readout optics. Examples of polytopic recording techniques that may be used in various embodiments of the present invention are described in U.S. Pat. App. No. 2004/0179251 (Anderson et al.), published Sep. 16, 2004; and U.S. Pat. App. No. 2005/0036182 (Curtis et al.), published Feb. 17, 2005, the entire disclosure and contents of which are hereby incorporated by reference.

For the purposes of the present invention, the term "fractal multiplexing" refers to multiplexing where the angle is changed in a direction which not as Bragg selective until the reconstruction is moved off the detector (e.g., camera).

For the purposes of the present invention, the term "beam waist" refers to the transverse dimension of the beam at a place where this dimension is smaller than after propagating away from this location (i.e., at the focus plane). See U.S. Published Application No. 2007/0127100 (Wilson et al.), published Jun. 7, 2007 (the entire disclosure and contents of which is herein incorporated by reference) which illustrates what is meant by a "beam waist."

For the purposes of the present invention, the term "mode" refers to a wavelength of light generated by a light source.

For the purposes of the present invention, the term "single mode" refers to a single wavelength of light generated by a light source. For example, a single mode laser produces a single dominant wavelength.

For the purposes of the present invention, the term "multi-mode" refers to multiple wavelengths of light generated by the light source. For example, a multi-mode laser produces multiple wavelengths of light with significant power.

For the purposes of the present invention, the term "optical steering subsystem" refers to any device or combination of devices capable of directing light in a particular direction. Exemplary optical steering subsystems may include a mirror (e.g., a galvo mirror), a combination of mirrors, lenses, prisms, mechanical stages, beam deflectors, etc.

For the purposes of the present invention, the term "partially reflective surface" refers to any surface of an object capable of reflecting a portion of light while allowing another portion to pass through the surface.

For the purposes of the present invention, the term "plane wave" refers to a constant-frequency wave whose wavefronts (surfaces of constant phase) are substantially or nearly parallel planes of constant amplitude and normal to the direction of the wave and exist in a localized region of space. Exemplary plane waves may include collimated light such as those associated with laser beams for laser pointers, etc. As a practical matter, plane waves may have some limited amount of aberration (e.g., focus) and still be considered a plane wave. If used with a phase conjugate readout, these aberrations will eventually degrade the signal-to-noise ratio (SNR) of the recovered (reconstructed) beam. In practice, a couple of aberrations the waves may be tolerable with the exact amount depending on which type of aberration exists.

For the purposes of the present invention, the term "processor" refers to a device capable of, for example, executing instructions, implementing logic, calculating and storing values, etc. Exemplary processors may include application specific integrated circuits (ASIC), central processing units, microprocessors, such as, for example, microprocessors commercially available from Intel and AMD, etc.

For the purposes of the present invention, the term "reading data" refers to retrieving, recovering, or reconstructing holographic data stored in a holographic storage medium.

For the purposes of the present invention, the term "recording data" refers to storing or writing holographic data in a holographic storage medium.

For the purposes of the present invention, the term "recording light" refers to a light source used to record information, data, etc., into a holographic storage medium.

For the purposes of the present invention, the term "phase conjugate" when referring to a light beam refers to a light beam which reverse the path of the original beam. An example would be a plane wave reference, wherein the phase conjugate reference beam would be an exact or very close replica of the original reference light beam, but propagating exactly or closely in the reverse direction of the original light beam (i.e., close to counter-propagating).

For the purposes of the present invention, the term "phase conjugate optical system" refers to any device that causes a reference beam (also referred to as a "reconstruction beam" when used for data recovery) of a holographic recovery system to be reflected (directed) back along the path of the reference (reconstruction) beam in the opposition direction. Examples of phase conjugate optical systems for plane waves include a corner cube, a corner cube array, a controlled electro-optic (EO) crystal, a controlled blazed grating, a holographic grating, surface relief structure, and the combination of a variable layer and a grating (whether a holographic grating or surface relief structure), etc.

For the purposes of the present invention, the term "recovered beam" refers to a beam generated by the reference (reconstruction) beam which is provided by the phase conjugate optical system. The phase conjugate of the reference (reconstruction) beam will reconstruct the phase conjugate of the data beam which propagates backwards along the original data beam's optical path to be recovered as a data page by a detector (e.g., camera). The recovered beam is formed by the phase conjugate reference (reconstruction) beam diffracting from a hologram of a data page stored in the holographic storage medium. For example, with angle multiplexed holograms, for a given angle a certain data page will be Bragg matched and the phase conjugate reference (reconstruction) beam will diffract and form the recovered beam. Since the phase conjugate reference (reconstruction) beam is used at that correct angle and wavelength (Bragg condition), the desired data page will be reconstructed as a phase conjugate beam which propagates back to where the data beam originated from. The phase conjugate nature allows the recovered beam to undo aberrations that may have been introduced during recording of the holograms and to form a higher quality data page at the detector. This happens if the hologram and reference (reconstruction) beam are within tolerance of being phase conjugate of the original reference beam and relative location to similar optics. For some optical designs, these tolerances may be multiple waves of aberration in the phase conjugate reference (reconstruction) plane wave and many tens of microns in relative position of the hologram and optical system. The reference (reconstruction) beam may also Bragg match out a traditional hologram, but may propagate out of the optical system (i.e., not back to the detector/SLM).

For the purposes of the present invention, the term "reference beam" refers to a beam of light not modulated with data. Exemplary reference beams include non-data bearing laser beams used while recording data to, or reading data from a holographic storage medium. In some embodiments, the reference beam may refer to the original reference beam used to record the hologram, to a reconstruction beam when used to recover data from the holographic storage medium, or to the phase conjugate of the original reference (reconstruction) beam.

For the purposes of the present invention, the term "refractive index profile" refers to a three-dimensional (X, Y, Z) mapping of the refractive index pattern recorded in a holographic storage medium.

For the purposes of the present invention, the term "dynamic range" or "M#" of a material refers to a conventional measure of how many holograms at a particular diffraction efficiency may be multiplexed at a given location in the material (e.g., recording material layer, holographic storage medium, etc.) and is related to the materials index change, material thickness, wavelength of light, optical geometry, etc.

For the purposes of the present invention, the term "diffraction efficiency" refers to the fraction or percentage of incident light is diffracted by the hologram being either read-out or reconstructed.

For the purposes of the present invention, the term "spatial light modulator" (SLM) refers to a device that stores information on a light beam by, for example, modulating the spatial intensity and/or phase profile of the light beam.

For the purposes of the present invention, the term "spatial light intensity" refers to a light intensity distribution or pattern of varying light intensity within a given volume of space.

For the purposes of the present invention, the term "book" or "stack" refers to a group of multiplexed holograms that span a particular angular range. A book is a group of multiplexed holograms that may be all in one location in the holographic storage medium or slightly shifted from one another or shifted from another group of holograms. The term book refers to both traditional books and composite books.

For the purposes of the present invention, the term "short stack" refers to sub-group of holograms within the address range of a book. For example, a book may be considered as a set of addresses that contain angles 1-500. This angular range may be further separated into "short stacks" so that short stack #1 contains angles 1-100, short stack #2 contains angles 101-200, etc.

For the purposes of the present invention, the term "composite book" refers to a book where at least some of the short stacks of the book do not occupy the same spatial location. In fact, it may be useful to "smear" out any optically induced distortions by placing short stacks in different spatial locations. In a composite book, the spatial locations of the short stacks may partially overlap one another, but differ enough spatially to mitigate any non-ideal media buildup due to multiple recordings in the same location.

For the purpose of the present invention, the term "waveplate" refers to any device that may be used to change the polarization of light. A waveplate is also sometimes referred to as a retarder and the terms may be used interchangeably herein. Exemplary waveplates, include a $\lambda/4$ waveplate (QWP) that may be used, for example, to cause ¼ wavelength phase shift in a light beam that may result in changing linearly polarized light to circular and vice versa. Further, for example, a light beam twice passing through a $\lambda/4$ waveplate may undergo a 90 degree rotation in the linear polarization of the light.

For the purpose of the present invention, the term "device" may refer to an apparatus, a mechanism, equipment, machine, etc.

For the purpose of the present invention, the term "servo mark" refers to a mark, pattern, etc., put on the media so as to allow or enable the media or system to be aligned accurately with respect to each other. Servo marks may also be used to align media to other media.

For the purpose of the present invention, the term "replication" refers to reconstructing holograms from at least one portion of one medium and then recording these reconstructions into a different medium (or a different portion of the same medium). In other words, the medium used to record the reconstructed holograms may be the same as that used to reconstruct the holograms or the medium used may be a different medium.

For the purpose of the present invention, the term "two-step replication method" refers to creating submasters and then creating a master from these submasters. The master medium may then be used to replicate the final or target media with all the data stored in the master medium. The advantage of two-step replicating is that a much higher diffraction efficiency may be created in the final master with a higher density recording making the replication process more possible/practical at higher densities. Two-step replicating also allows for higher diffraction efficiencies in the final replicated media so that the drive may have higher performance. See Ernest Chuang, et al. "Holographic Read-Only-Memory System for High-Speed Replication," Jpn. J. Appl. Phys., 42 (2003), pp. 976-80, the entire disclosure and contents of which is hereby incorporated by reference.

For the purpose of the present invention, the term "data mask" refers to a fixed data page pattern to be recorded or a single data page pattern to be put onto a SLM.

For the purpose of the present invention, the term "holographic master data mask" refers to a hologram of a data mask or a group of holograms of data pages which are multiplexed.

For the purpose of the present invention, the term "virtual layer" refers to a group of holograms which have the same multiplexing address. For example, in an angle multiplexed medium with multiple books of holograms, each recorded with the same angles, the virtual layer is the first page of all the books. This is because a plane wave the size of the medium at the right incident angle to read out the first page will readout all first pages from all the books stored on the medium. Thus, it may be possible to replicate a virtual layer all at one time.

For the purpose of the present invention, the term "master" (also known as a "master holographic medium," "master data holographic storage medium" or "master data holographic medium") refers to a medium which has all of the holograms desired for the final medium and may be used to replicate other medium therefrom. Use of a holographic master is described in U.S. Patent Application No. 2005/0036182 (Curtis et al.), published Feb. 17, 2005, the entire disclosure and contents of which are hereby incorporate by reference.

For the purpose of the present invention, the term "submaster" (also known as a "submaster holographic medium," "submaster data holographic storage medium" or "submaster data holographic medium") refers to a medium which fewer than all of the holograms desired for the final replicated medium. Submasters may be used to create masters by replicating a couple or several submasters into a single master medium. Submasters may have different virtual layers (i.e., where the hologram(s) are stored at different angles).

For the purpose of the present invention, the term "target medium" (also known as a "target holographic medium," or "target holographic storage medium") refers to the medium which has been or which will be replicated with all of the holograms and therefore has or will contain all the data needed.

For the purpose of the present invention, the term "blank master medium" refers to a master medium before holograms are recorded, stored, etc., thereon.

For the purpose of the present invention, the terms "alignment" or "align" (for example, "alignment between layers" or "to align data masks") refer to a positioning of two objects with respect to each other to within tolerances needed by the process or the drive.

For the purpose of the present invention, the term "radially aligned" (for example, "radially aligned reference beams") refers to reference beams were the angle change is in the plane of a radial spoke of the medium where the spoke is centered at the center of the medium (e.g., disk).

For the purposes of the present invention, the term "Fourier Transform (FT) plane" refers to the back focal plane of a lens. If an image is placed at the front focal plane of the lens this plane will roughly approximate the mathematical Fourier Transform of that spatial signal. For the purposes of the present invention, the FT plane may be any plane that is close or proximate to the back focal plane. In addition, the FT plane need not be an exact mathematical equivalent of the FT of the image as, for example, there may be residual phase terms, field curvature, distortion, and other aberrations in the lens. At roughly the FT plane, the angular spectrum of the image is mapped to spatial positions. This allows for a block/filter to be positioned at the FT plane to filter the angular spectrum of the image (signal).

For the purposes of the present invention, the term "transforming optical system" refers to an optical system which performs a Fourier Transform (FT) function.

For the purposes of the present invention, the term "VanderLugt setup" refers to a transforming optical system comprising a lens with a data mask or SLM placed next to it (after the data mask or SLM in the direction of light propagation). This arrangement may result in the back focal plane having a heavily aberrated FT plane.

For the purposes of the present invention, the term "high order transform components" refers to diffraction orders, other than the zeroth order (i.e., an order which is not centered on the optical axis of the system).

For the purpose of the present invention, the term "ROM" refers to read-only memory. ROM may include memory which cannot be modified (at least not very quickly or easily), memory which may be erased and re-programmed multiple times such as, for example, Erasable Programmable read-only memory (EPROM) and flash Electrically Erasable Programmable read-only memory (EEPROM), etc.

For the purpose of the present invention, the term "HROM" refers to a holographic read-only memory device.

For the purpose of the present invention, the term "media reader" refers to a device (e.g., a memory card reader) which reads storage media, for example, ROM media (e.g. a ROM card).

For the purpose of the present invention, the term "memory card" refers to solid-state electronic and/or holographic memory data storage device which may be used with digital cameras, handheld and portable (mobile) computers, personal digital assistants (PDAs), telephones, music players, video game players, etc., as well as combinations thereof.

For the purpose of the present invention, the terms "backwards compatible," "backwards compatibility," etc. refer to storage media (e.g., memory cards) of an older design than a newer storage media, but which are able to function in a media reader designed for both the newer and older media.

For the purposes of the present invention, the terms "global reference" or "global reference beam" refer to a reference beam which may readout a virtual layer of the medium. For rectangularly-arranged books, this may happen very naturally with all the reference beams likely to be aligned if written with the same equipment. But for disks, the reference beam multiplexing direction may change as the disk is rotated about. Thus, to establish a global reference for a disk which is angle multiplexed or which has a non-normal reference beam may be extremely difficult to achieve.

For the purposes of the present invention, the term "global reference readout" refers to use of a global reference to readout the holograms in that particular virtual layer.

For the purposes of the present invention, the term "global master" (for example, a "global master disk") refers to a master disk which has one or more global references so that it may be used to replicate media quickly.

For the purposes of the present invention, the terms "conical wave" refers to a beam which has a conical or cone like wave-front.

For the purposes of the present invention, the terms "conical-like beam" refers to a beam which is similar to a conical wave-front and which is interchangeable with a conical wave.

For the purposes of the present invention, the term "conical mirror" refers to a mirror in the shape of the cone.

For the purposes of the present invention, the term "conical angle" refers to the angle of the conical wave-front or conical mirror with respect to the normal of the medium surface.

For the purposes of the present invention, the term "footprint" (for example, "footprint of a mirror") refers to an area, portion, section, etc., on the medium (e.g., disk) which cannot illuminated, e.g., by the particular mirror.

For the purposes of the present invention, the term "angle of incidence" refers to the angle between a beam incident on a surface and a line perpendicular to the surface at the point of incidence, i.e., the "normal."

For the purposes of the present invention, the term "medium normal" refers to an angle of incidence perpendicular (orthogonal) to medium surface.

For the purposes of the present invention, the term "de-magnified wavefront" refers to the beam after it has been de-magnified (made smaller) by an optical system.

For the purposes of the present invention, the term "conical references" refers to a conical beam which is used as reference beam for hologram recording, reconstruction, readout, etc.

For the purposes of the present invention, the terms "recording reference" refers to a reference beam used for recording holograms one page at a time and may be similar in size to a single book.

For the purposes of the present invention, the term "copying reference" refers to a reference beam used to reconstruct a virtual layer (several or many holograms) and to replicate (copy) them into another medium (or different portion of the same medium). Copying references may be the size of the media to be copied.

For the purposes of the present invention, the terms "usable" or "usage" (for example, "usage areas or regions of a disk") refer to an area, portion, section, etc., of a medium on or in which holograms, data, etc., may be recorded.

For the purposes of the present invention, the term "unusable" (for example, "unusable regions or areas of a disk") refers to an area, portion, section, etc., of a medium on or in which holograms, data, etc., cannot be recorded. For example, this may be due to the inability to access that area, portion, section, etc., of the medium with reference beams or some other disk problem.

For the purposes of the present invention, the term "reference beam multiplexing direction" refers to the direction which the multiplexing angle is changed to when angular multiplexing is used.

For the purpose of the present invention, the term "holographic storage device or system" refers to a device or system which may record (store) holographic data, which may read (recover) holographic data, or which may record (store) and read (recover) holographic data.

DESCRIPTION

Embodiments of the present invention may be in the form of, for example, methods, devices, systems, articles, etc. In at least some embodiments of the present invention, recording and reading of books of holograms may be with the books arranged, for example, along circular tracks or lines in the medium, etc. To help facilitate finding the holograms (e.g., holographic data) recorded in the medium, servo marks may be put into the substrates of the medium to help identify the location of the hologram(s) on the disk. The medium structure and optics used may potentially be made so that a backward compatible device could be made. This means that the holographic drive device may be able to read and write in other formats such as CD, DVD, HD-DVD, Blu-ray Disc, etc. Ideally, the objective lens used in the holographic drive device may also read CD, DVD, high-density optical disc formats (e.g. Blu-ray™ disks), etc. Other portions of the holographic drive device might be able to be shared for the conventional optical readout of standard optical media types. Providing a single holographic drive that reads and writes conventional optical disks and holographic optical disks recorded using the monocular architecture may be advantageous to customers using such drives.

For cards or tape or other media where the holographic books are arranged such that all the page 1 of each book is at the same angle for all books on the media, and all the page 2 in every book is at the same angle, a two-step replication method may be used as described in U.S. Published Application No. 2005/0254108 (Chuang et al.), published Nov. 17, 2005 and Ernest Chuang, et al. "Holographic Read-Only-Memory System for High-Speed Replication," *Jpn. J. Appl. Phys.*, 42 (2003), pp. 976-80, the entire disclosure and contents of the above patent application and article are hereby incorporated by reference. The Chuang et al. methods for recording on holographic storage media and/or holographic master data masks may include recording at least a first hologram or virtual layer(s) into a first holographic medium (e.g., a first "submaster") and recording at least a second virtual layer(s) into a second holographic medium (e.g., a second "submaster"). The first set of virtual layers and the second set of virtual layers from the first and second holographic storage mediums are then sequentially reconstructed and stored with a single holographic master medium (e.g., a "master"). This holographic master may then be used to record the stored first and second set of virtual layers into additional holographic media, for example, for use in HROM devices. These final media and the master contain all of the holograms (data) which need to be replicated.

In one embodiment of the Chang et al. methods, data masks may be used to record virtual layers or holographic images having a plurality of data pages centered at different locations on a holographic storage medium such that readout of individual pages may be achieved in a page-wise fashion. In one example, parallel recording of multiple data pages in each layer may allow for the fast replication of HROM media with increased storage capacity, and page-wise readout of HROM media allows for faster read rates than bitwise readout. The increased storage capacity may be due in part to increased diffraction efficiency by recording multiple data pages in the storage media in parallel. The data transfer rates may be increased in part because of parallel detection of an entire data page without moving the media as in serial storage devices such as CDs, magnetic disks, etc.

In another embodiment of the Chang et al. methods, one or more data masks may be stored in a holographic storage medium to create a holographic master data mask (sometimes referred to herein as a "master" or "master holographic medium") for use in recording in holographic storage media. In one example, a holographic master data mask may be fabricated with multiple virtual layers or data layers and used to record or copy (replicate) one or more of the stored data layers to a holographic storage medium such as HROM medium. The holographic master data mask may be multiplexed to retrieve the various data masks with improved alignment and speed between recording different layers without the need to move and align a plurality of data masks. Additionally, the holographic master data mask may be placed at or near a quasi Fourier transform plane of the stored data masks using a VanderLugt setup or other transforming optical system. Holographic master data masks may be recorded at or near Fourier planes or image planes of the optical system. The Fourier transform location in these systems may filter out high order transform components during recording the holographic master data mask, and reduce interference between stored data pages when recording an HROM or the like, thereby improving readout performance.

In another embodiment of the Chang et al. methods, a plurality of submaster holographic media may be used to provide the holographic master medium. For example, a set of desired holograms may be sequentially recorded into a plurality of separate holographic media, e.g., a plurality of "submasters." Thereafter, the holograms recorded in the submasters may be copied to another holographic storage medium, a "master." The master holographic medium may be used as a master data mask, etc., to replicate further holographic storage media since the master contains all of the data/holograms which is present in all of the submasters.

In another embodiment of the Chang et al. methods, one or more data masks may be recorded in a holographic master data mask. The holographic master data mask may then be used to record multiple holographic layers in a holographic storage media, such as HROM storage media, etc. For example, the holographic master data mask may be used to holographically record an entire virtual layer across a holographic storage medium. Each virtual layer may be divided into multiple data pages of information to be recorded in parallel. Multiple layers may be multiplexed onto a holographic storage medium using wavelength, angle, peristrophic, confocal, polytopic, phase-code, polytopic, etc., multiplexing techniques. In producing the holographic master data mask, data pages and stacks of data pages may be carefully aligned and recorded in the holographic master data mask, and the alignment maintained by using the holographic master data mask to replicate holographic storage media. For example, rather than aligning successive data masks, the various data masks to be recorded may be aligned and then recorded into a holographic master data mask by wavelength or angle multiplexing. The correct data mask may be recalled with, for example, the appropriate wavelength or angle when it is desired to be imaged and stored. This makes the interchange of data masks very quick and easy during the replication process allowing for fast cycle times. On readout of the medium, the alignment of the pages and stacks of pages created by the holographic master data mask may be increased such that readout is improved with minimal time for mechanical alignment and servo in the drive between different pages of a stack. Additionally, careful alignment of layers or between stacks of data page in a layer may be used to detect fake, unauthorized, or pirated storage media. For example, by intentionally varying the alignment or creating a particular alignment between page stacks or between layers in a predetermined way, a signature of a valid storage medium may be generated in the medium itself.

In another embodiment of the Chang et al. methods, polytopic multiplexing may be used. See, for example, U.S. Pat. No. 7,092,133 (Anderson et al.), issued Aug. 15, 2006, the entire disclosure and contents of which is hereby incorporated by reference for a suitable polytopic multiplexing technique for use herein to increase the layer density by making the individual data page stacks smaller spatially. Polytopic multiplexing may also be used in conjunction with wavelength, angle, fractal, or other holographic multiplexing techniques. Polytopic multiplexing allows holograms to be spatially multiplexed onto a holographic storage media with partial spatial overlap between neighboring holograms and/or stacks of holograms. Each individual stack of data pages may additionally take advantage of an alternate multiplexing scheme such as angle multiplexing, wavelength multiplexing, phase code multiplexing, peristrophic multiplexing, fractal multiplexing, etc. Generally, the holograms are separated by an amount equal to the beam waist of the data beam writing the hologram. Unlike more traditional approaches, the beam waist may be intentionally placed outside of the holographic storage medium such that there is significant beam overlap between stacks inside the medium. Upon reconstruction, the data pages and its neighboring data pages will all be readout simultaneously, but an aperture (filter) placed at the beam waist of the reconstructed data filters out the neighbors that are readout such that only the desired data is detected. See, for example, U.S. Published Application No. 2007/0127100 (Wilson et al.), published Jun. 7, 2007 (the entire disclosure and contents of which is hereby incorporated by reference) which illustrates this technique for recording and reconstructing holograms. Polytopic multiplexing may be implemented with the beam waist inside of the media with the aperture(s) placed at another Fourier plane or by using an angle filter that filters out the neighboring data page reconstructions.

In embodiments of the HROM replication method of the present invention, the submasters may be recorded page by page into a submaster medium. The medium may be bigger than the final medium or thicker or thinner than the final medium to be used in the holographic drive. More than one submaster may be in the same medium but may be spatially separated. The submasters may be copied into a final master medium. This master media also may not have reflective layers or variable layers and may thus be thicker, thinner, or larger than the final replicated medium. See copending U.S. application Ser. No. 11/840,410, entitled "MONOCULAR HOLOGRAPHIC DATA STORAGE SYSTEM ARCHITECTURE," to Curtis et al., filed Aug. 17, 2007 (the entire disclosure and contents of which is hereby incorporated by reference) for illustrations of reflective and variable layers. The medium may be copied by placing the blank master medium next to the sub-master and illuminating with a beam that is as big as the data area of the final replicated media. This process copies all of the page 1's (i.e., data pages multiplexed with angle 1) into the master at the same time by the standard contact replication process. All pages may be put into the master medium by this method by changing the angle of the large reference beam and switching in and using all the submasters. One sub-master may be used or many sub-masters could be used. This process does two things. One is results in a master having much higher diffraction efficiency than if just recorded one page at a time. The other is it allows for the holograms, when copied from the master, to be at the correct depth in the replicated medium to be used in the holographic drive. This final master may then be used in the replication process. Again by placing the blank medium (the final medium to be used in the holographic drive) next to the master media all the pages may be copied (recorded) into this final medium quickly by exposing one angle at a time with a beam that covers the entire medium. Since the final medium is used in the holographic drive it may have a variable layer and a grating or reflective layer. During this replication stage, since this replication stage is the same as a write (record) state, these virtual layers may be set to minimize the reflections from them. Phase conjugate readout or normal readout may be used at any copy (replication) stage in this process with the blank medium placed at the appropriate side of the master or submaster to allow for copying (replication).

With, for example, a disk as the holographic storage medium, the reference beams used with each book may change around the disk. In order to make this work or function correctly as described above, a consistent reference may be needed for each page across the medium. To carry this out, the submaster medium may have to use another reference beam during recording of the hologram(s). This third (global) reference beam has to change angle with the books as they are recorded around the disk so that once the whole disk is recorded, this global reference may readout both the data of page 1 of every book on the disk, as well as the correct reference beam of that book. These reconstructed holograms are then copied (recorded) into the master that is placed next to it. Once these special submasters are recorded with global references, the process described above may be used to make masters and replicate the final media. Creating a global master may be extremely difficult for a disk since the change of angle per location may have to be followed in the machine (i.e., holographic drive) to yield a global reference. An example of a global reference is disclosed in "Duplication Technology for Secured Read-Only Holographic Versatile Disk," *Optical Data Storage Conference* (Jul. 11, 2005 Honolulu Hawaii paper MB7), the entire disclosure and contents of which is hereby incorporated by reference. This may be extremely difficult to practically implement.

If the holographic drive's reference beam is aligned to a radius of a disk of a holographic storage medium and all the holograms in the books on the disk are recorded at the same angular intervals, then a conical wave may be able to readout all of a given page from each book at one time (one virtual layer). This process requires generating a conical wave centered on the disk axis. This may be achieved by using conical mirrors. The problem in using a conical mirror to generate a conical-like beam for readout is that angle onto the disk has to be extremely high (e.g. greater than about 65 degrees) in order to make the footprint of the mirror to be small enough on the disk. In practice, reference (reconstruction) beam angles in a holographic drive are likely to be less than about 60 degrees. When measured from medium normal, typical reference beam angles are between about 20 and about 60 degrees. The larger angle for the book/page based recording may waste too much of the medium and an anti-reflection coating may be difficult to make work at larger angles of incidence from medium normal. This method might be used if the conical reference waves are magnified smaller to provide a demagnified wavefront to make the footprint of the mirror on the disk (unusable area) smaller. This demagnified wavefront may then be stored holographically to make reference storage medium. By changing the conical mirror and changing the angle of the reference plane wave, multiple conical references may be stored in the reference storage media. Multiple reference storage media may be used if high diffraction efficiency is required. The concept of a reference medium may make replication times much faster. Still this method may have difficulty in producing small enough angles for disk-sized media with larger usage regions on the disk for recording. In addition, the optics for the reference beam would have to be larger than the media which for a standard optical disk size is very large and of good quality. The conical beam for replication is locally like the plane wave reference (reconstruction) beam needed for readout. Again the drive reference beam multiplexing direction (change of angle) would have to be aligned radially to the disk from the center (i.e., along a radius or "spoke" of the disk). In addition, some curvature in the reference (reconstruction) beam maybe desirable to better match the conical or conical-like beam used for replication. Because of an entire virtual layer is being to readout at a time, reasonable medium flatness may be required so that the same incidence angle is able to readout all of the holograms in the virtual layer, regardless of location on medium.

For embodiments of HROM replication methods of the present invention, submasters may be recorded with radially aligned reference beams with the holograms recorded one at a time. These submasters may then be converted into masters by using the reference storage medium to generate the reference beam that reads out all page 1's at the same time and then all page 2's at the same time, etc. The change in conical angle may be achieved by reading out a different angle multiplexed hologram from the reference storage media. As described above, the blank master medium be placed next to the submasters. Once the master medium is fabricated, it may be used as the master for replicating into a blank final medium. Again the blank final medium may be placed close to the master and the different copying (replication) references may be generated from the reference storage medium by angle multiplexed recovery.

Figure 1:
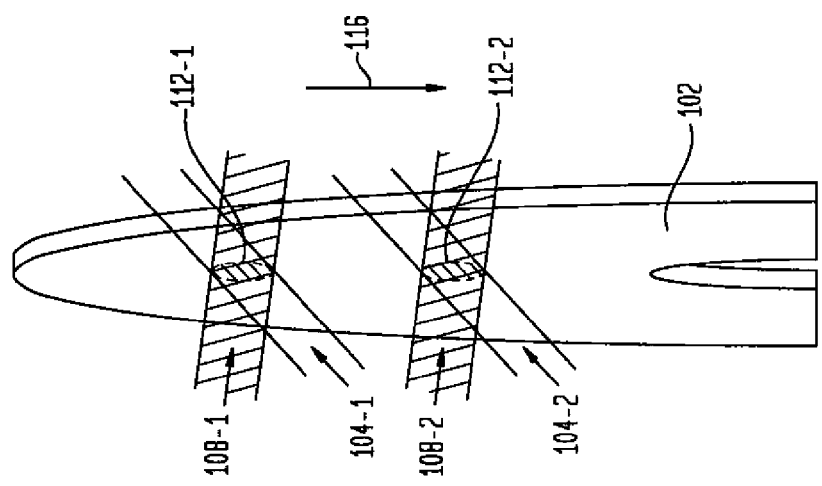
FIG. 1 is a schematic illustration of a conventional page-by-page recording of holograms in a disk-shaped holographic storage medium.

Embodiments of the HROM replication method of the present invention are further illustrated by reference to FIGS. 1 though 4. FIG. 1 is a schematic illustration of a conventional page-by-page recording of holograms in a generally circular disk-shaped holographic storage medium 102. As shown in FIG. 1, reference beam 104-1 and data beam 108-1 (each representing the recording of one or more holograms at a first position in disk 102) are projected into disk 102 and interfere to form a first data page 112-1 in disk 102. As shown in FIG. 1 by the direction of dashed arrow 116, recording of one or more of holograms in disk 102 occurs at a second position by the projection of reference beam 104-2 and data beam 108-2 into disk 102 to form a second data page 112-2. This process may be repeated to form other data pages in disk 102.

FIG. 2 schematically illustrates replication of one or more holograms in parallel from a master data holographic storage medium in the form of, for example, a generally circular-shaped master data disk 202 to a target holographic storage medium in the form of, for example, a generally circular-shaped target disk 206, according to embodiments of the Chang et al. methods. The copying (replication) reference (reconstruction) beam 204 reconstructs representative data pages 212-1 and 212-2 in parallel from master data disk 202, and transfers these reconstructed data pages (illustrated as beams 224-1 and 224-2) to target disk 206. The reconstructed data pages 224-1 and 224-2 may then be recorded as replicated data pages 232-1 and 232-2 in target disk 206.

In embodiments of the present invention, copying (replication) reference (reconstruction) beam 204 may be generated in the form of a conical reference beam for symmetrically exposing the entire master disk 202 at the same reference (reconstruction) beam angle. To more effectively generate conical or conical-like waves for the reference (reconstruction) beam used for readout and for copying (replicating) entire "layers" of angle or Bragg multiplexed holograms in master data disk 202, a conical prism may be designed or used for this purpose to generate low enough angles and to illuminate a large enough data area of the master data disk 202. This technique to generate conical or conical-like reference (reconstruction) beams solves the problems of using mirrors and is schematically illustrated in FIG. 3 where copying (replication) reference (reconstruction) beam 304 (represented by portions 304-1 and 304-2) may be used to readout and reconstruct layers of data pages from a master data holographic medium in for the form of, for example, a generally circular-shaped master data disk 302 having disk axis 310. Reference (reconstruction) beam 304 reaches conical prism 326 which generates a conical reference (reconstruction) beam 340 (represented by conical beam portions 340-1 and 340-2) which covers (illuminates) the entire master data disk 302 and which is centered approximately on the disk axis 310. Conical reference (reconstruction) beam 340 shown in FIG. 3 represents one angle of the original reference beam which may be used to generate the respective data pages in master data disk 302, and may readout and copy (replicate) one virtual layer of data pages from master data disk 302 to a target holographic storage medium in the form of, for example, generally circular-shaped target disk 306. By using a reference storage medium, the replication step may be made very fast which may be an economic necessity.

Figure 4:
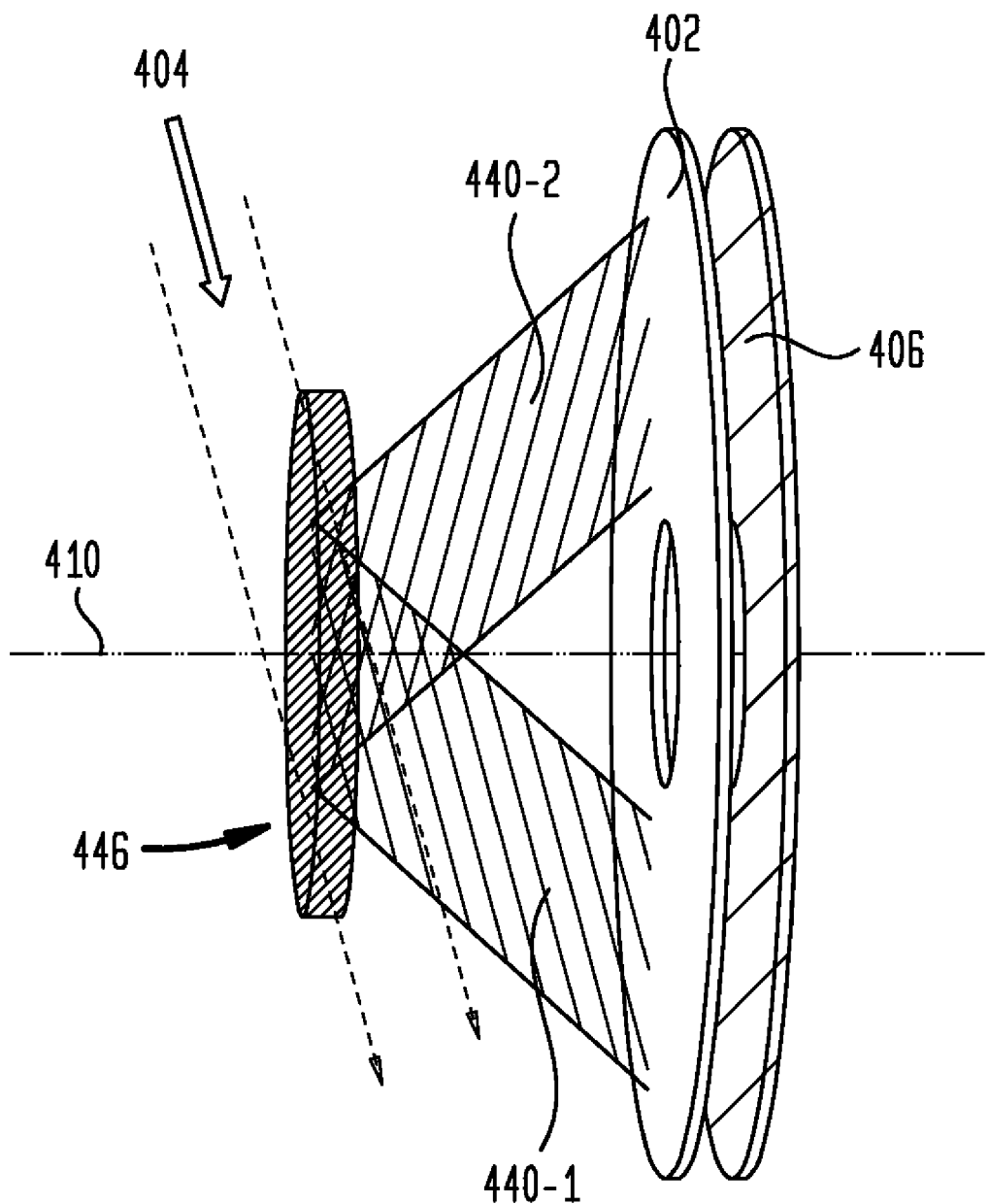
FIG. 4 is a schematic illustration of using an embodiment of the conical reference (reconstruction) beam hologram element of FIG. 3 to replicate in parallel holograms from the master data disk to the target disk.

Instead of using a conical prism 326 for generating conical reference (reconstruction) beams 340 to copy (replicate) data pages from master data disk 302 to target disk 306, a conical reference (reconstruction) beam hologram element 346 may be created and used in place of conical prism 326. To create hologram element 346, different prisms the same or similar to that of conical prism 326 may be used which generate different conical or conical-like waves which may then be stored in hologram element 346 by angle multiplexing through changing the angle of reference beam 340 incident to element 346. The use of this conical reference (reconstruction) beam hologram element to replicate data pages from a master data holographic storage medium in the form of, for example, a generally circular-shaped master data disk 402 to a target holographic storage medium in the form of, for example, a generally circular-shaped target disk 406 is illustrated schematically in FIG. 4. In FIG. 4, a reference (reconstruction) beam 440 is transmitted to conical reference (reconstruction) beam hologram element 446. From reference (reconstruction) beam 404, conical reference (reconstruction) beam hologram element 446 generates a conical reference (reconstruction) beam 440 (represented by conical beam portions 440-1 and 440-2 shown in FIG. 4) which covers the entire master data disk 402 and is centered approximately on disk axis 410. This conical reference (reconstruction) beam 440 generated by hologram element 446 reads out a layer of data pages in master data disk 402. By changing the angle of reference (reconstruction) beam 404, another conical or conical-like reference (reconstruction) beam 440 may be generated which is incident onto master data disk 402 at a different angle, thus copying (replicating) a different virtual layer of data pages from master data disk 402 into target disk 406. By reading out master data disk 402 with conical reference (reconstruction) beams 440 at a sufficient number of differing incident angles, all the data pages stored in master data disk 402 may be reconstructed and copied (replicated) into target disk 406. If the diffraction efficiency of one reference storage element 446 is too low with all layers stored, multiple storage elements may be switched in for better light efficiency.

Embodiments of the HROM replication method of the present invention may also be used in conjunction with the "monocular architecture" of U.S. application Ser. No. 11/840,410, entitled "MONOCULAR HOLOGRAPHIC DATA STORAGE SYSTEM ARCHITECTURE," to Curtis et al., filed Aug. 17, 2007, the entire disclosure and contents of which is hereby incorporated by reference. In this "monocular architecture," a holographic data storage device or system utilizes a single objective lens (monocular architecture) through which the data beam and reference beam are passed prior to the entering the holographic storage medium and which may combine angle and polytopic multiplexing, as well as utilizing phase conjugate reconstruction and readout of multiple holograms. The monocular architecture in these devices or systems may provide more compact recording and reading of data pages in a holographic storage medium. For copying (replication), the reference beam may be multiplexed along a radial angle so that the conical or conical-like reference (reconstruction) beam may readout the holograms for copying (replication) to the target disk. Any angle multiplexed master data disk may be copied (replicated) by this procedure if the multiplexing angle range of reference beams is aligned correctly.

In certain embodiments, target disks 306 and 406 may have a recording material layer for recording the one or more replicated holograms, a reflective layer to create a phase conjugate beam, and one or more variable layers to minimize reflections from the reflective layer. For example, target disk 306 or 406 may comprise a variable beam transmission layer underneath the recording material layer which absorbs light beams when the one or more replicated holograms are being recorded in the recording material layer, and which allows light beams to pass through when one or more replicated holograms recorded in the recording material layer are being recovered therefrom, and a reflective layer underneath this variable layer for reflecting light beams passed by the variable layer to thereby create a phase conjugate beam. Holographic storage media suitable as target disks 306 and 406 comprising the recording material layer, the reflective layer and one or more variable layers are exemplified in, for example, FIGS. 27 and 28 and the corresponding description of FIGS. 27 and 28 at paragraphs [00152] through [00159], as well as in FIG. 29 and the corresponding description of FIG. 29 at paragraphs [00160] through [00162] in U.S. application Ser. No. 11/840, 410, entitled "MONOCULAR HOLOGRAPHIC DATA STORAGE SYSTEM ARCHITECTURE," to Curtis et al., filed Aug. 17, 2007, the entire disclosure and contents of which is hereby incorporated by reference.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom. Examples of such changes may include use of wavelength or other multiplexing techniques for storing holograms and references, rather than the angle multiplexing as illustrated in FIGS. 1 through 4, etc.

What is claimed is:

1. A device or system comprising:
a reference beam source which generates a reference beam;
a conical prism through which the reference beam passes and which generates a conical or conical-like reference beam for illuminating a master data holographic storage medium having one or more recorded holograms, to thereby replicate the one or more recorded holograms in a target holographic storage medium; and
wherein the master data holographic storage medium which is illuminated comprises a generally circular-shaped master data disk, and wherein the one or more holograms are replicated in a generally circular-shaped target holographic storage medium comprising a target disk,
wherein the target holographic storage medium comprises a recording material layer for recording the one or more replicated holograms, a reflective layer to create a phase conjugate beam, and one or more variable layers to minimize reflections from the reflective layer.

2. The device or system of claim 1, wherein the master data disk is a HROM disk.

3. The device or system of claim 1, wherein the one or more variable layers comprise a variable beam transmission layer underneath the recording material layer which absorbs light beams when the one or more replicated holograms are being recorded in the recording material layer, and which allows light beams to pass through when the one or more replicated holograms recorded in the recording material layer are being recovered therefrom; and wherein the reflective layer is underneath the variable layer for reflecting light beams passed by the variable layer to thereby create a phase conjugate beam.

4. The device or system of claim 1, wherein the conical or conical-like reference beam illuminates the entire master data holographic storage medium.

5. A device or system comprising:
a reference beam source which generates a reference beam;
a conical reference beam holograph element which, when illuminated with the reference beam, generates a conical or conical-like reference beam for illuminating a master data holographic storage medium having one or more recorded holograms, to thereby replicate the one or more recorded holograms in a target holographic storage medium; and
wherein the target holographic storage medium comprises a recording material layer for recording the one or more replicated holograms, a reflective layer to create a phase conjugate beam, and one or more variable layers to minimize reflections from the reflective layer.

6. The device or system of claim 5, wherein the one or more variable layers comprise a variable beam transmission layer underneath the recording material layer which absorbs light beams when the one or more replicated holograms are being recorded in the recording material layer, and which allows light beams to pass through when the one or more replicated holograms recorded in the recording material layer are being recovered therefrom; and wherein the reflective layer is underneath the variable layer for reflecting light beams passed by the variable layer to thereby create a phase conjugate beam.

7. The device or system of claim 5, wherein the angle of the reference beam is changed relative to the conical reference beam holograph element to generate conical or conical-like reference (reconstruction) beams which are incident onto the master data holographic storage medium at different angles, to thereby replicate different layers of data pages from the master data holographic storage medium into the target holographic storage medium.

8. The device or system of claim 5, wherein the angle of the reference beam is changed relative to the conical reference beam holograph element to generate conical or conical-like reference (reconstruction) beams which are incident onto the master data holographic storage medium at a sufficient number of different angles such that all data pages from master data holographic storage medium are replicated into the target holographic storage medium.

9. A method comprising the following steps:
(a) providing a conical or conical-like reference beam; and
(b) illuminating a master data holographic storage medium having one or more recorded holograms, to thereby replicate the one or more recorded holograms in a target holographic storage medium,
wherein the target holographic storage medium comprises a recording material layer for recording the one or more replicated holograms, a reflective layer to create a phase conjugate beam, and one or more variable layers to minimize reflections from the reflective layer.

10. The method of claim 9, wherein the conical or conical-like reference beam is provided during step (a) by passing a reference beam through a conical prism.

11. The method of claim 9, wherein the conical or conical-like reference beam is provided during step (a) by passing a reference beam through a conical reference beam holograph element which, when illuminated with the reference beam.

12. The method of claim 11, wherein during step (a), the angle of the reference beam relative to the conical reference beam holograph element to generate conical or conical-like reference (reconstruction) beams which are incident onto the master data holographic storage medium at different angles; and wherein during step (b) different layers of data pages are replicated from the master data holographic storage medium into the target holographic storage medium.

13. The method of claim 12, wherein the angle of the reference beam is changed during step (a) to generate conical or conical-like reference (reconstruction) beams which are incident onto the master data holographic storage medium at a sufficient number of different angles during step (b) such that all data pages from master data holographic storage medium are replicated into the target holographic storage medium.

14. The device or system of claim 9, wherein the one or more variable layers comprise a variable beam transmission layer underneath the recording material layer which absorbs light beams when the one or more replicated holograms are being recorded in the recording material layer, and which allows light beams to pass through when the one or more replicated holograms recorded in the recording material layer are being recovered therefrom; and wherein the reflective layer is underneath the variable layer for reflecting light beams passed by the variable layer to thereby create a phase conjugate beam.

* * * * *